United States Patent
Kouchi (10) Patent No.: US 10,576,872 B2
(45) Date of Patent: Mar. 3, 2020

(54) HEAD LAMP DEVICE OF STRADDLE VEHICLE

(71) Applicant: KAWASAKI JUKOGYO KABUSHIKI KAISHA, Kobe-shi, Hyogo (JP)

(72) Inventor: Kaoru Kouchi, Kakogawa (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 16/136,099

(22) Filed: Sep. 19, 2018

(65) Prior Publication Data
US 2019/0092218 A1    Mar. 28, 2019

(30) Foreign Application Priority Data
Sep. 25, 2017 (JP) .................. 2017-183647

(51) Int. Cl.
| B60Q 1/068 | (2006.01) |
| F21S 41/63 | (2018.01) |
| B60Q 1/04 | (2006.01) |
| F21S 41/675 | (2018.01) |
| F21V 14/04 | (2006.01) |
| F21S 41/657 | (2018.01) |

(52) U.S. Cl.
CPC .......... B60Q 1/0683 (2013.01); B60Q 1/045 (2013.01); F21S 41/635 (2018.01); F21S 41/657 (2018.01); F21S 41/675 (2018.01); F21V 14/04 (2013.01); B60Q 2200/30 (2013.01); B60Y 2200/12 (2013.01)

(58) Field of Classification Search
CPC ....... B60Q 1/0683; B60Q 1/045; F21V 14/04; F21S 41/635; F21S 41/657; F21S 41/675
See application file for complete search history.

(56) References Cited

U.S. PATENT DOCUMENTS

| 2,138,076 A * | 11/1938 | Taylor .................. B60Q 1/0683 362/372 |
| 2003/0012023 A1* | 1/2003 | Mochizuki ............... B60Q 1/06 362/296.01 |
| 2014/0009951 A1* | 1/2014 | Monma ...................... B62J 6/02 362/509 |

FOREIGN PATENT DOCUMENTS

JP        S63-9497 Y2     3/1988

* cited by examiner

*Primary Examiner* — Anh T Mai
*Assistant Examiner* — Nathaniel J Lee
(74) *Attorney, Agent, or Firm* — Alleman Hall Creasman & Tuttle LLP (57) ABSTRACT

A head lamp device of a straddle vehicle, the head lamp device having an optical axis adjustment mechanism, comprises a housing; and an internal unit including a light source device which emits light, and a light output device which outputs in a forward direction the light emitted from the light source device, through the housing, the internal unit being accommodated in the housing in a state in which the internal unit is tiltable with respect to the housing. The internal unit includes a support point part which is tiltably supported by the housing. In a front view, the support point part is disposed in an area center of the internal unit or at a location that is in the vicinity of the area center.

15 Claims, 4 Drawing Sheets

HEAD LAMP DEVICE OF STRADDLE VEHICLE

CROSS-REFERENCE TO THE RELATED APPLICATION

This application claims priority to and the benefit of Japanese Patent Application No. 2017-183647 filed on Sep. 25, 2017, the entire disclosure of which is incorporated herein by reference.

BACKGROUND OF THE INVENTION

Field of the Invention

The present invention relates to a head lamp device which is mounted on a straddle vehicle and has an optical axis adjustment function.

Description of Related Art

For example, Japanese Examined Utility Model Application Publication No. Sho. 63-9497 discloses a head lamp device of a straddle vehicle such as a motorcycle, which is provided with an optical axis adjustment mechanism. The optical axis adjustment mechanism includes a support point member which supports a light unit in such a manner that the light unit is rotatable, and a plurality of screws which tilt the light unit around the support point member as a support point.

In the head lamp device including the optical axis adjustment mechanism, it is necessary to secure a space in which the light unit is tilted in optical axis adjustment. This increases the size of a housing.

SUMMARY OF THE INVENTION

In view of the above-described circumstances, an object of the present invention is to reduce the size of a housing in a head lamp device of a straddle vehicle including an optical axis adjustment mechanism.

According to an aspect of the present invention, there is provided a head lamp device of a straddle vehicle, the head lamp device having an optical axis adjustment mechanism, the head lamp device comprising: a housing; and an internal unit including a light source device which emits light, and a light output device which outputs in a forward direction the light emitted from the light source device, through the housing, the internal unit being accommodated in the housing in a state in which the internal unit is tiltable with respect to the housing, wherein the internal unit includes a support point part which is tiltably supported by the housing, and wherein in a front view, the support point part is disposed in an area center of the internal unit or at a location that is in the vicinity of the area center.

In accordance with this configuration, since the support point part around which the internal unit is tiltable is disposed in the area center of the internal unit or at a location that is in the vicinity of the area center, in a front view, a distance from the support point part to the outer edge of the internal unit can be reduced. This structure can reduce the maximum amount of movement of the outer edge of the internal unit for obtaining a predetermined tilt motion angle in a case where the internal unit is tilted around the support point part as a support point. As a result, the size of the housing can be reduced in the head lamp device of the straddle vehicle including the optical axis adjustment mechanism.

The light source device may include a light emitting diode (LED)

The light source device including the light emitting diode has a life longer than that of a light source device including a filament light source. In accordance with the configuration of the present invention, it is not necessary to provide the opening in the housing, through which the light source is changed (replaced). The support point part can be placed in an opening region of the filament light source. Thus, it becomes possible to easily form a structure for placing the support point part in the area center of the internal unit or at a location that is in the vicinity of the area center, in a front view.

In a front view, a wall surface of a rear wall part of the housing which is located rearward of the internal unit may be continuous, in a region including the light source device or the area center, and the rear wall part of the housing may be provided with a support point member which is coupled to the support point part of the internal unit.

In accordance with this configuration, since the opening including the light source device and the area center is not formed in the rear wall part of the housing, it becomes possible to easily form a structure for placing the support point part in the area center of the internal unit or at a location that is in the vicinity of the area center, in a front view.

In a front view, the support point part may be disposed at a center of the internal unit in a vertical direction or at a location that is in the vicinity of the center of the internal unit in the vertical direction, and the support point part may be tiltable around an axis line extending in a rightward and leftward direction.

In accordance with this configuration, it becomes possible to suitably reduce the maximum amount of movement in the vertical direction, of the outer edge of the internal unit for obtaining a predetermined tilt motion angle. As a result, the dimension of the housing in the vertical dimension can be reduced.

In a front view, the support point part may be disposed at a center of the internal unit in a lengthwise direction or at a location that is in the vicinity of the center of the internal unit in the lengthwise direction, and the support point part may be tiltable in a direction perpendicular to the lengthwise direction.

In accordance with this configuration, it becomes possible to suitably reduce the maximum amount of movement in the direction perpendicular to the lengthwise direction, of the outer edge of the internal unit for obtaining a predetermined tilt motion angle. As a result, the dimension of the housing in the direction perpendicular to the lengthwise direction can be reduced.

In a front view, the support point part may be disposed at a center of the internal unit in a rightward and leftward direction or at a location that is in the vicinity of the center of the internal unit in the rightward and leftward direction, and the support point part may be tiltable around an axis extending in a vertical direction.

In accordance with this configuration, it becomes possible to suitably reduce the maximum amount of movement in the rightward and leftward direction, of the outer edge of the internal unit for obtaining a predetermined tilt motion angle. As a result, the dimension of the housing in the rightward and leftward direction can be reduced.

The head lamp device may further comprise: a first operation member which tilts the internal unit around the support point part in a first direction perpendicular to a forward and rearward direction, with respect to the housing; and a second operation member which tilts the internal unit around the support point member in a second direction perpendicular to a forward and rearward direction, with respect to the housing, and in a front view, the support point part may be disposed closer to the area center of the internal unit than the first operation member and the second operation member.

In accordance with this configuration, it becomes possible to suitably reduce the maximum amount of movement in the direction perpendicular to the forward and rearward direction, of the outer edge of the internal unit for obtaining a predetermined tilt motion angle, in a case where the optical axis adjustment is performed by using one of the first operation member and the second operation member. As a result, the dimension of the housing in the direction perpendicular to the forward and rearward direction can be reduced.

In a front view, a distance from the area center of the internal unit to the support point part may be shorter than a half of a distance from the area center of the internal unit to the first operation member and may be shorter than a half of a distance from the area center of the internal unit to the second operation member.

In accordance with this configuration, it becomes possible to sufficiently reduce the maximum amount of movement of the outer edge of the internal unit for obtaining a predetermined tilt motion angle, in a case where the optical axis adjustment is performed by use of one of the first operation member and the second operation member.

According to another aspect of the present invention, there is provided a head lamp device of a straddle vehicle, the head lamp device having an optical axis adjustment mechanism, the head lamp device comprising: a housing; and an internal unit including a light source device which emits light, and a light output device which outputs in a forward direction the light emitted from the light source device, through the housing, the internal unit being accommodated in the housing in a state in which the internal unit is tiltable with respect to the housing, wherein the internal unit includes a support point part which is tiltably supported by the housing, and wherein in a front view, the support point part is disposed at a location where the support point part overlaps with the light source device or at a location that is adjacent to the location where the support point part overlaps with the light source device.

In accordance with this configuration, since the support point part around which the internal unit is tiltable is disposed in the area center of the internal unit or at a location that is in the vicinity of the area center, in a front view, a distance from the support point part to the outer edge of the internal unit can be reduced. This structure can reduce a maximum amount of the movement of the outer edge of the internal unit for obtaining a predetermined tilt motion angle in a case where the internal unit is tilted around the support point part. As a result, the size of the housing can be reduced.

The above and further objects, features and advantages of the present invention will more fully be apparent from the following detailed description of a preferred embodiment with reference to the accompanying drawings.

DETAINED DESCRIPTION OF THE PREFERRED EMBODIMENTS

Hereinafter, the embodiment of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction of the vehicle body of the motorcycle corresponds with a rightward and leftward direction.

Figure 1:
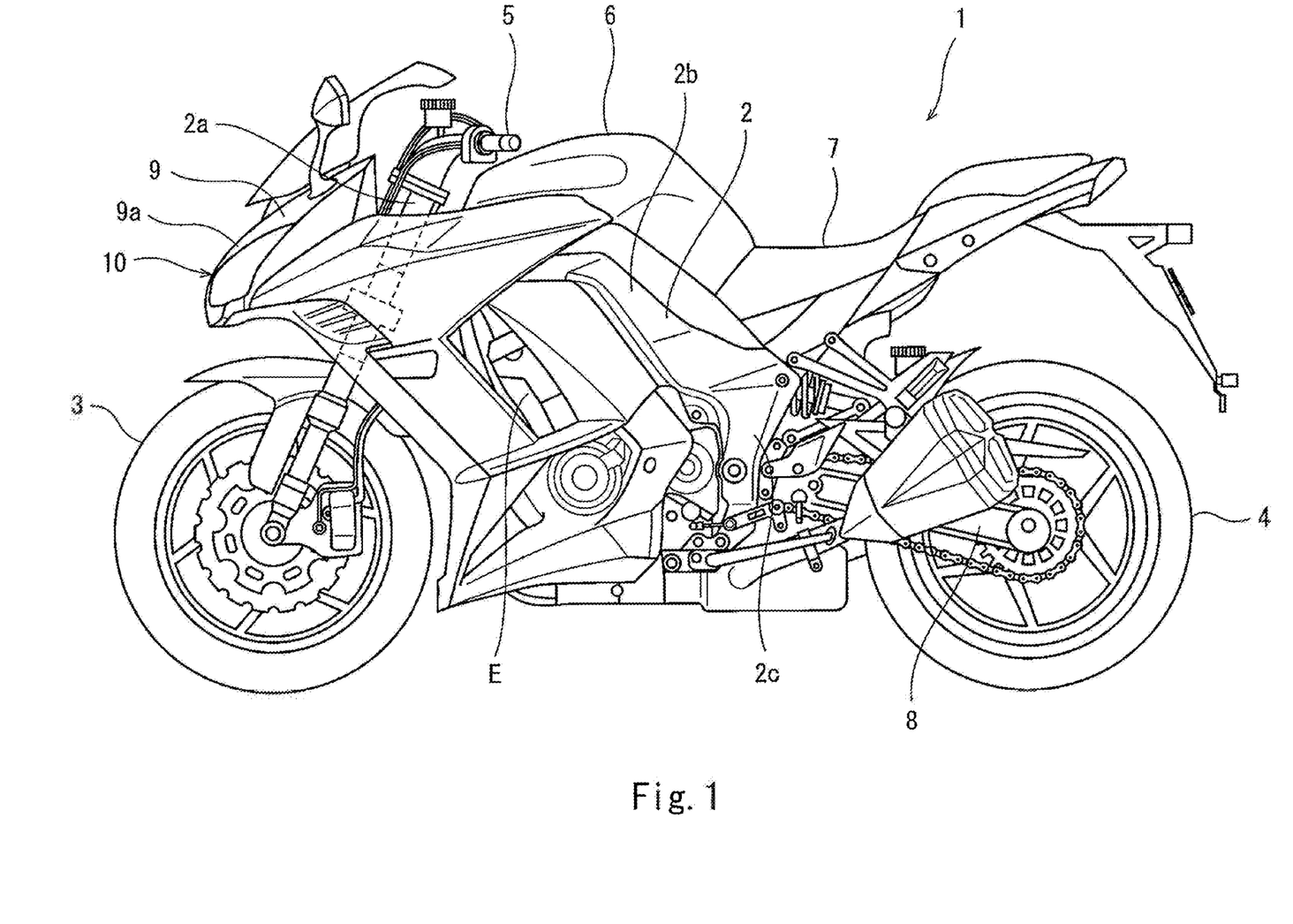
FIG. 1 is a side view of a motorcycle on which a head lamp device according to an embodiment is mounted.

FIG. 1 is a side view of a motorcycle 1 on which a head lamp device 10 according to an embodiment is mounted. Referring now to FIG. 1, the motorcycle 1 which is an example of the straddle vehicle includes a vehicle body frame 2, a front wheel 3 supported by the vehicle body frame 2, and a rear wheel 4 supported by the vehicle body frame 2. The front wheel 3 is a driven wheel. The rear wheel 4 is a drive wheel. The vehicle body frame 2 includes a head pipe 2a, a main frame 2b extending rearward from the head pipe 2a, and a pivot frame 2c connected to the rear portion of the main frame 2b. The head pipe 2a supports a steering shaft (not shown) connected to a bar-type handle 5 which can be gripped by the rider in such a manner that the steering shaft is rotatable. When the steering shaft rotates, the front wheel 3 is steered to the right or the left.

A fuel tank 6 is disposed at the upper side of the main frame 2b at a location that is rearward of the handle 5. A seat 7 is disposed behind the fuel tank 6. The rider straddles the seat 7. The front end portion of a swing arm 8 is mounted on the pivot frame 2c in such a manner that the swing arm 8 is pivotable. The rear wheel 4 is rotatably mounted on the rear end portion of the swing arm 8. A prime mover (driving power source) E (e.g., internal combustion engine or electric motor) is supported by the main frame 2b and the pivot frame 2c. The head lamp device 10 is supported by the vehicle body frame 2 and disposed in front of the head pipe 2a. The head lamp device 10 emits light to a region forward of the motorcycle 1.

A front cowl 9 is supported by the vehicle body frame 2. The front cowling 9 covers the front side of the head pipe 2a. The front cowling 9 is provided with an opening 9a into which a light transmission section 21b of a housing 11 of the head lamp device 10 is fitted. In a state in which the housing 11 is fitted into the front cowling 9, the light transmission section 21b and a portion of the front cowling 9 which is in the vicinity of the light transmission section 21b are continuous with each other. In other words, a level difference (step) between the light transmission section 21b and the front cowling 9 can be reduced. The front cowling 9 has a streamline shape in which a dimension in a vehicle width direction (the rightward and leftward direction) and a dimension in a vertical direction are gradually increased, from its front end portion toward its rear portion. This shape can reduce an air resistance. To reduce the air resistance, a projected area of the front cowling 9, in a front view, is preferably small. If the dimension in a direction perpendicular to a forward and rearward direction, of the housing 11 fitted into the front cowling 9, can be reduced, the size of the front cowling 9 covering the housing 11 can be reduced, and hence the air resistance can be easily reduced in a whole vehicle body. By reducing the dimension in the forward and rearward direction, of the housing 11, the dimension in the forward and rearward direction, of the front cowling 9, can be reduced, or a space for components (constituents) other than the housing 11, which can be accommodated in the front cowling 9, can be increased.

Figure 2:
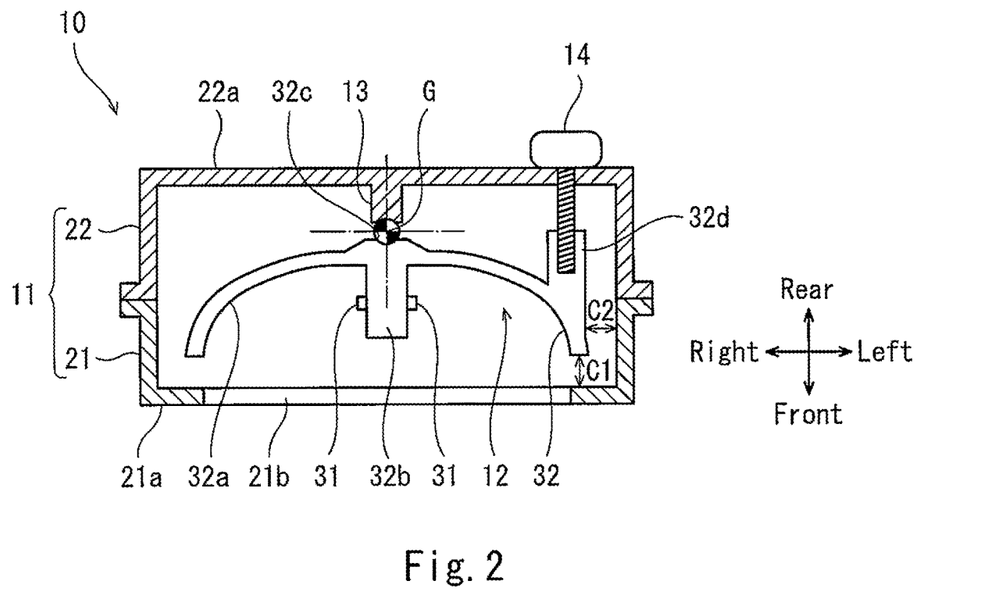
FIG. 2 is a schematic horizontal sectional view of the head lamp device of FIG. 1, when viewed from above.
Figure 3:
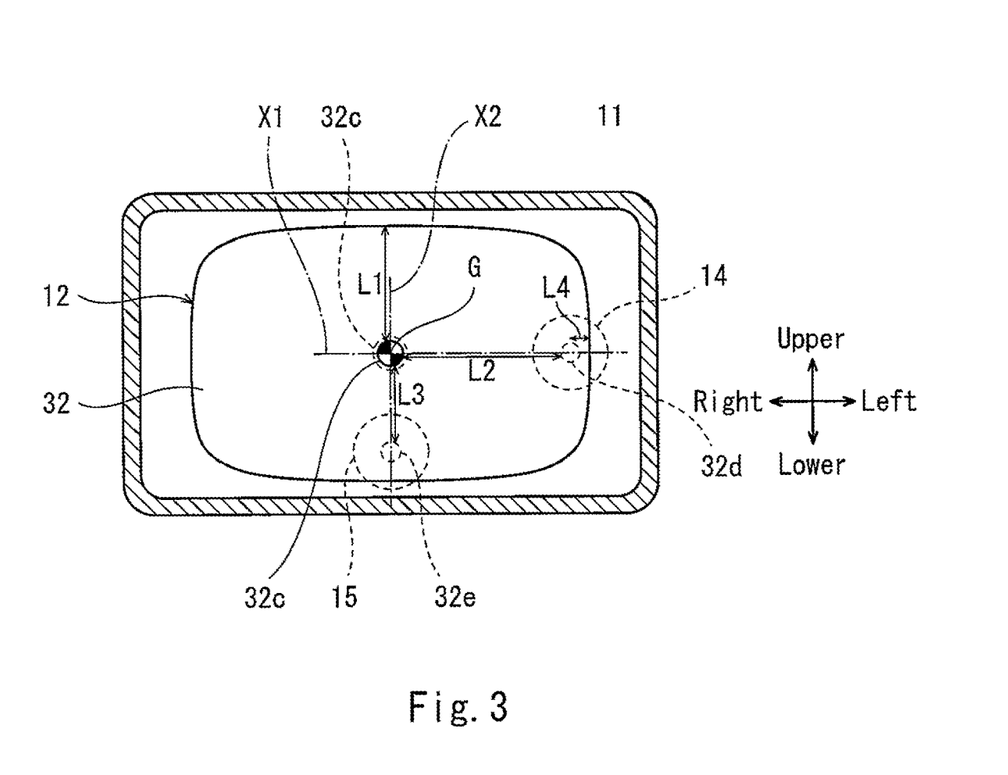
FIG. 3 is a schematic vertical sectional view of the head lamp device of FIG. 2, in a front view.

FIG. 2 is a schematic horizontal sectional view of the head lamp device 10 of FIG. 1, when viewed from above. FIG. 3 is a schematic vertical sectional view of the head lamp device 10 of FIG. 2, in a front view (when viewed from the front). As shown in FIGS. 2 and 3, the head lamp device 10 has an optical axis adjustment mechanism. The head lamp device 10 includes the housing 11, an internal unit 12, a support point member 13, a first screw 14 (first operation member), and a second screw 15 (second operation member). The housing 11 includes a front member 21 and a rear member 22.

The front member 21 and the rear member 22 are detachably coupled to each other. In this way, the housing 11 having an inner space is formed. The housing 11 is integrated with and secured onto the vehicle body frame 2. The front member 21 includes a non-light-transmission section 21a made of a non-transparent material, and a light transmission section 21b (transparent section) which is made of a light transmissive material which is transparent or translucent and is configured to transmit light emitted from the internal unit 12, in a forward direction. The rear member 22 is entirely made of a non-transparent material. The rear member 22 has a rear wall part 22a disposed rearward of the internal unit 12.

The internal unit 12 is accommodated in an inner space of the housing 11. The housing 11 forms a tilt motion permission space to prevent interference between the internal unit 12 and the housing 11 when the internal unit 12 is tilted within a tilt motion permission range. Specifically, a clearance C1 is formed between the internal unit 12 and the housing 11 in the forward and rearward direction. In addition, a clearance C2 is formed between the internal unit 12 and the housing 11 in a direction perpendicular to the forward and rearward direction. The internal unit 12 includes light source devices 31 and a light output device 32. Each of the light source devices 31 includes a light emitting diode (LED) and a circuit board thereof. The light output device 32 is a reflector body which reflects in the forward direction the light emitted from the light source devices 31 and outputs this light from the light transmission section 21b to a region forward of the motorcycle 1. The light output device 32 includes a reflector section 32a formed with a reflective layer on a front surface, and a light source support section 32b protruding forward from the center of the reflector section 32a. In the present embodiment, the light source devices 31 are bonded to the light source support section 32b or fastened to the light source support section 32b by bolts. Therefore, the light source devices 31 cannot be detached from the light source support section 32b without using a tool. In a state in which the light source devices 31 are integrated with and secured to the light output device 32, the light source devices 31 and the light output device 32 are tilted together within the housing 11. This makes it possible to adjust the direction of the light while keeping a light emission angle (width) and a light amount which are optically designed.

In a front view (in a front view in a state in which the head lamp device 10 is mounted on the motorcycle 1), the rear wall part 22a of the housing 11 is not provided with an opening including an area center G of the internal unit 12 and the light source devices 31. The light source devices 31 each including the light emitting diode of the present embodiment have a life longer than that of a light source device including a filament light source. For this reason, a structure for changing (replacing) the light source can be omitted or simplified. Specifically, it is not necessary to provide the opening in the housing 11, through which the light source is changed (replaced). Thus, the rear wall part 22a does not have the opening which is to be closed by a lid or the like from the rear.

The area center G may be a figure center of a contour of the internal unit 12, i.e., center of gravity of the internal unit 12. Or, the area center G may be a figure center of a contour surface defined by a front edge portion of the internal unit 12. Further, the area center G may be a figure center of a contour surface of an emission surface (e.g., reflection surface or refraction surface) for guiding the light, of the internal unit 12. In this way, the area defining the area center G may be the area center of the contour, the contour of the front edge portion, or the contour of the emission surface. The area center G may be a center of the defined area in a first direction in which a first tilt motion axis line X1 extends, or a center of the defined area in a second direction in which a second tilt motion axis line X2 extends. In this case, the area center G may be deviated from the center of the defined area, in directions other than the direction specifying the center. Moreover, the area center G is preferably the center of the contour in both of the first and second directions, of the internal unit 12.

The support point member 13 protrudes from the rear wall part 22a toward the support point part 32c of the internal unit 12. The support point member 13 may be integrated with the rear wall part 22a, or may be separate from the rear wall part 22a and may be secured onto the rear wall part 22a. The internal unit 12 includes the support point part 32c provided at the back surface of the reflector section 32a at a location corresponding to the light source support section 32b. The support point member 13 is rotatably joined to the support point part 32c, and thus supports the internal unit 12 accommodated in the housing 11 in such a way that the internal unit 12 is tiltable (can perform a tilt motion).

Specifically, the support point member 13 has a spherical convex (protruding) portion at its tip end thereof. The support point part 32c has a spherical concave (depressed) portion to which the spherical convex portion is fittable. In this structure, a spherical bearing is formed. The internal unit 12 is supported by the housing 11 in such a way that the internal unit 12 is tiltable around the center of a sphere as a support point. The support point part 32c is rotatable in the direction perpendicular to the forward and rearward direction. Therefore, the internal unit 12 is tiltable (able to perform a tilt motion) around the first tilt motion axis line X1 extending in the rightward and leftward direction, and the second tilt motion axis line X2 extending in the vertical direction. Note that the tilt motion axis lines X1, X2 of the internal unit 12 pass through the support point part 32c, extend in the direction perpendicular to the forward and rearward direction, and is placed inside the housing 11.

In a front view (when viewed from the front), the support point part 32c of the internal unit 12 is disposed at the area center G of the internal unit 12, or at a location that is in the vicinity of the area center G. For example, in a front view, a distance between the center of the support point part 32c of the internal unit 12 and the area center G is 0 to 45% of a shortest distance L1 between the outer edge of the internal unit 12 and the area center preferably, 0 to 30% of the shortest distance L1, and most preferably, 0 to 15% of the shortest distance L1. The phrase "a distance between the center of the support point part 32c of the internal unit 12 and the area center G is 0% of the shortest distance L1" means that the support point part 32c conforms to the area center G in a front view. In the present embodiment, in a front view, the support point part 32c is disposed at a center of the internal unit 12 in the vertical direction (center in a widthwise direction) or at a location that is in the vicinity of the center of the internal unit 12 in the vertical direction, and at a center of the internal unit 12 in the rightward and leftward direction (lengthwise direction) or at a location that is in the vicinity of the center of the internal unit 12 in the rightward and leftward direction. More specifically, in a front view, the support point part 32c conforms to the area center G.

In a front view, at least a portion of the support point part 32c may be located to overlap with the light source or the light source device 31. At least a portion of the support point part 32c may be located to be adjacent to the location where the support point part 32c is located to overlap with the light source or the light source device 31. Further, the support point part 32c may be disposed at the back surface wall of the housing 11 at a location where the support point part 32c faces the light source device 31 in the forward and rearward direction.

The internal unit 12 includes a first female thread part 32d and a second female thread part 32e which are provided on the back surface side of the reflector section 32a. A straight line (first tilt motion axis line X1) connecting the first female thread part 32d to the support point part 32c and a straight line (second tilt motion axis line X2) connecting the second female thread part 32e to the support point part 32c cross each other (are orthogonal to each other in the present embodiment). The first screw 14 and the second screw 15 are attached on the rear wall part 22a of the housing 11. The first screw 14 is threadingly engageable with the first female thread part 32d. The second screw 15 is threadingly engageable with the second female thread part 32e. The axis of the first screw 14 and the axis of the second screw 15 extend in the forward and rearward direction.

In a front view, the first screw 14 and the second screw 15 are more distant from the area center G than the support point part 32c. In a front view, a distance from the area center G of the internal unit 12 to the support point part 32c is shorter than a half of a distance L2 from the area center G of the internal unit 12 to the first screw 14 and is shorter than a half of a distance L3 from the area center G of the internal unit 12 to the second screw 15. In a front view, the first female thread part 32d and the second female thread part 32e are disposed at locations that are in the vicinity of the outer edge of the internal unit 12. For example, in a front view, a shortest (minimum) distance L4 from the center of the first female thread part 32d to the outer edge of the internal unit 12 is 0 to 50% of the distance L2 from the area center G of the internal unit 12 to the center of the first female thread part 32d, more preferably 0 to 30% of the distance L2, and most preferably 0 to 20% of the distance L2.

Figure 4:
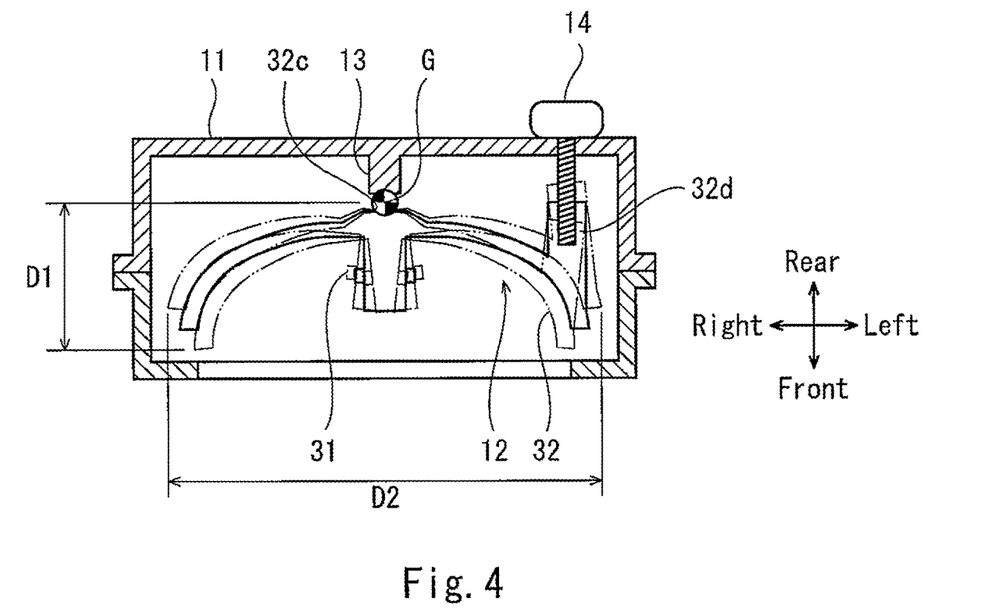
FIG. 4 is a view showing the operation of the head lamp device of FIG. 2.

FIG. 4 is a view showing the operation of the head lamp device 10 of FIG. 2. As shown in FIGS. 3 and 4, when the first screw 14 is rotated, the internal unit 12 is tilted in the first direction (rightward and leftward direction) around the first tilt motion axis line X1, in a front view. When the second screw 15 is rotated, the internal unit 12 is tilted in the second direction (vertical direction) around the second tilt motion axis line X2, in a front view. By rotating the first screw 14 and the second screw 15 in this way, the optical axis of the internal unit 12 can be adjusted.

In a front view, the support point part 32c as a support point around which the internal unit 12 is tilted is disposed at the area center G of the internal unit 12, or at a location that is in the vicinity of the area center and a distance from the support point part 32c to the outer edge of the internal unit 12 is short. This structure can reduce the maximum amount of movement of the outer edge of the internal unit 12 for obtaining a predetermined tilt motion angle in the optical axis adjustment. For this reason, it becomes possible to reduce a movable range (region) D1 in the forward and rearward direction and a movable range (region) D2 in the direction perpendicular to the forward and rearward direction, of the internal unit 12. Therefore, the clearance C1 and the clearance C2 which are formed between the housing 11 and the internal unit 12 can be set to smaller ones. As a result, the size of the housing 11 of the head lamp device 10 can be reduced.

Figure 5:
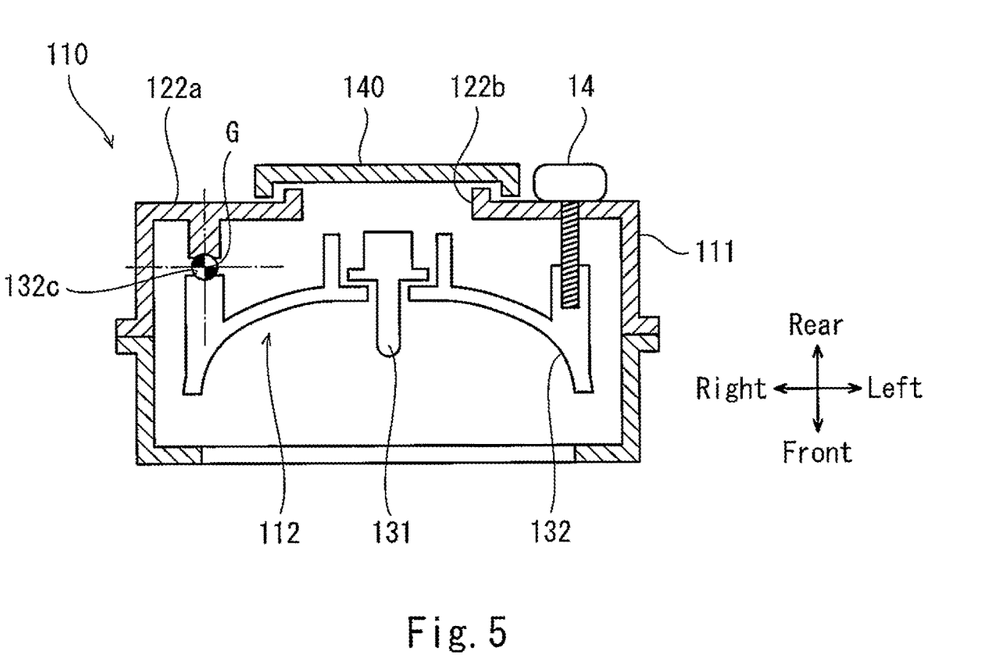
FIG. 5 is a schematic horizontal sectional view of a head lamp device according to a comparative example, when viewed from above.
Figure 6:
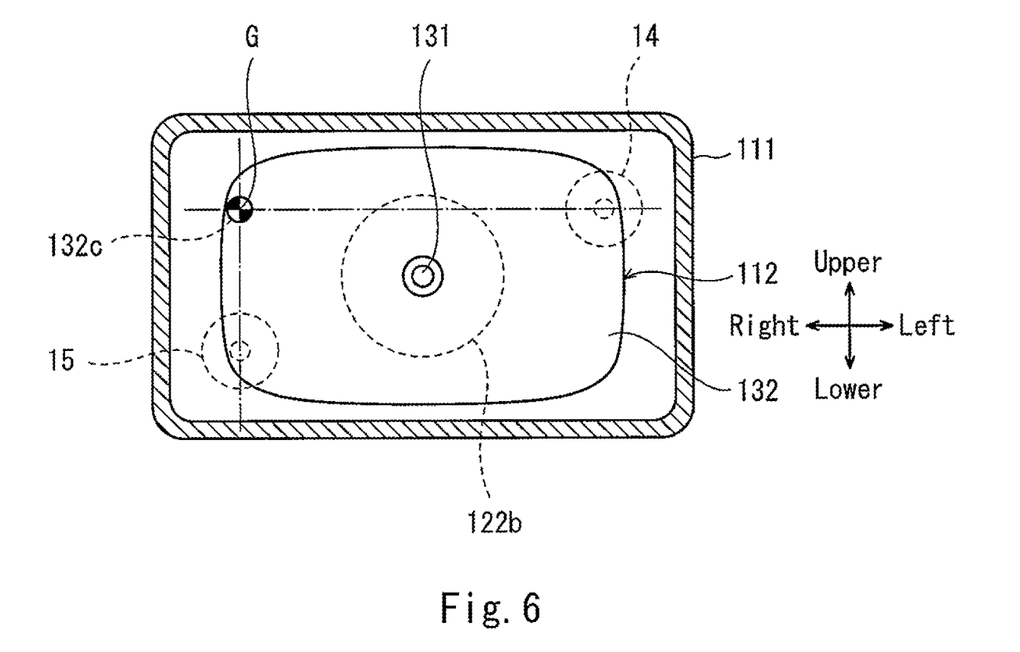
FIG. 6 is a schematic vertical sectional view of the head lamp device of FIG. 5, in a front view.
Figure 7:
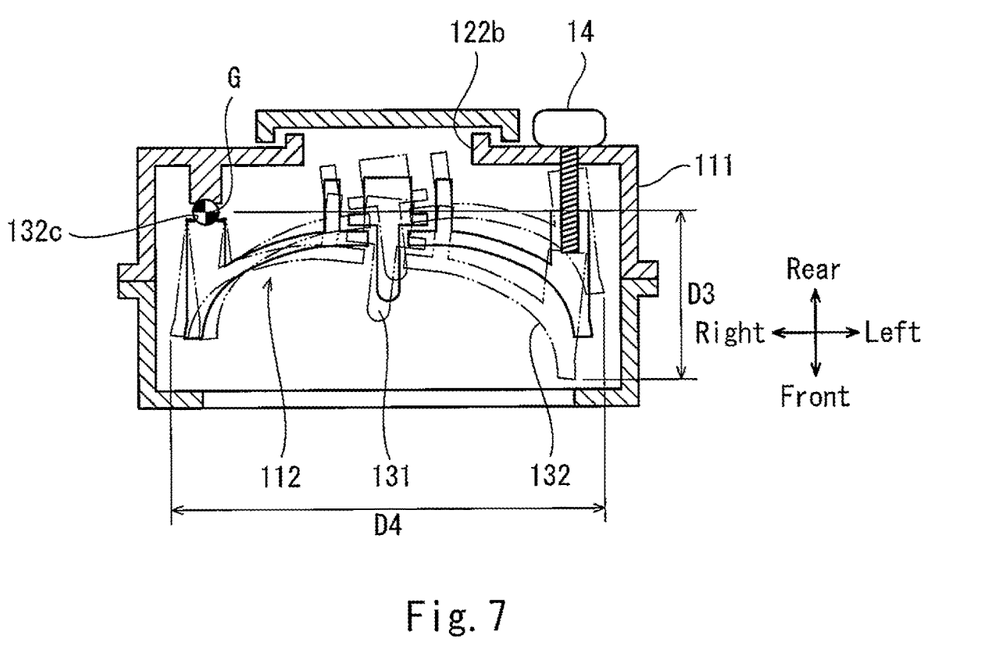
FIG. 7 is a view showing the operation of the head lamp device of FIG. 5.

FIG. 5 is a schematic horizontal sectional view of a head lamp device 110 according to a comparative example, when viewed from above. FIG. 6 is a schematic vertical sectional view of the head lamp device 110 of FIG. 5, in a front view. FIG. 7 is a view showing the operation of the head lamp device 110 of FIG. 5. As shown in FIGS. 5 and 6, the head lamp device 110 according to the comparative example, includes a light source device 131 of a valve type, including a filament. In a front view, a rear wall part 122a of a housing 111 is formed with an opening 122b including the light source device 131, through which the light source device 131 is changed (replaced). The opening 122b is closed by a lid 140 which is detachably attached to the housing 111, from the rear.

The housing 111 has the opening 122b with a relatively large size, at a location that is rearward of an area center (in a front view) of an internal unit 112 including the light source device 131 and a light output device 132 and a region that is in the vicinity of the area center. In this structure, in a front view, a support point part 132c of the internal unit 112 is disposed at a location that is in the vicinity of the outer edge of the housing 111. In this case, a distance from the support point part 132c to the outer edge of the internal unit 112 is long. In a case where the first and second screws 14, 15 are rotated to perform optical axis adjustment, the maximum amount of movement of the outer edge of the internal unit 112 for obtaining a predetermined tilt motion angle is increased. This increases a movable range (region) D3 in the forward and rearward direction and a movable range (region) D4 in the direction perpendicular to the forward and rearward direction, of the internal unit 112. Therefore, it is difficult to reduce the size of the housing 111.

As can be clearly seen from a comparison between FIG. 4 and FIG. 7, the size of the housing 11 can be easily reduced, in the head lamp device 10 having the optical axis adjustment function. Therefore, design flexibility of the front cowling 9 can be improved, and the weight of the front cowling 9 can be reduced. In the case of a vehicle in which the head lamp device is rotatable together with the handle, a steering operability can be improved due to reduced weight. Since the clearances formed between the housing 11 and the internal unit 12 can be reduced, members used to cover the clearances can be omitted or their sizes can be reduced. The external appearance of the housing 111 can be designed more flexibly. The configuration of the present application is suitable for the motorcycle in which the outer shape of the head lamp device is the stream line shape which is sharp to reduce the air resistance.

Since the area defined in the front edge portion of the internal unit 12 or the contour of the light emission surface is the reference of the area center the amount of a portion of the housing 11 which protrudes toward the front edge portion of the internal unit 12 can be reduced, and the size of the housing 11 can be reduced. This makes it easier to reduce the size of the front cowling 9 and more flexibly design the front cowling 9, while lessening a level difference between the front cowling 9 and the housing 11. For example, the air resistance can be reduced, the weight of the front cowling 9 can be reduced, and the external design appearance can be improved. For example, by reducing the amount of movement of the housing 11 located on the outer side in the vehicle width direction or in the vertical direction, the amount of a portion of the cowling 9 which protrudes outward in the vehicle width direction and outward in the vertical direction can be reduced, and the air resistance can be reduced.

In a case where one of a first-direction dimension and a second-direction dimension of the defined area is larger than the other, the center of the defined area corresponding to a lengthwise-direction dimension (larger dimension) may be the area center G. This makes it easier to reduce the size in a direction in which the effects of reduction of the size are significant.

The present invention is not limited to the above-described embodiment, and the configuration may be changed, added, or deleted. For example, the light output device of the head lamp device may be a projector lens of a direct-emission light, instead of the reflector. Although in the above-described embodiment, the female thread parts 32d, 32e are provided at the internal unit 12, and the first and second screws 14, 15 having the male threads are provided at the housing 11, the positional relation between the male threads and the female threads may be reversed. Although in the above-described embodiment, two screws are provided to correspond to one internal unit 12, one screw may be provided to correspond to one internal unit 12. Although in the above-described embodiment, the support point member 13 has the spherical surface convex portion, and the support point part 32c has the spherical surface concave (depressed) portion, the support point member 13 may have the spherical surface concave (depressed) portion and the support point part 32c may have the spherical surface convex portion. The internal unit 12 may contain an extension filling a clearance formed between the reflector body 32a and the housing 11. In a case where the light source which has a long life and does not require a change (replacement) in maintenance is used, a light source (e.g., filament type) which is other than the LED may be used. Although in the above-described embodiment, the present invention is applied to the motorcycle which is an example of the straddle vehicle is described, the present invention may be applied to other vehicles such as an all terrain vehicle (ATV) so long as the rider straddles a seat of the vehicle.

Although in the above-described embodiment, the internal unit 12 is provided with the plurality of light sources, the present invention is not limited to this, and the internal unit 12 may be provided with one light source. Further, one internal unit may be provided with a high beam light source and a low beam light source. One vehicle body may be provided with a plurality of head light devices. A right head light device and a left head light device may be separately provided. Moreover, an internal unit which is independently tiltable may be provided within one housing. In these cases, since the size of the head light device can be reduced, the whole of the vehicle body can be designed more flexibly.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

The invention claimed is:

1. A head lamp device of a straddle vehicle, the head lamp device having an optical axis adjustment mechanism, the head lamp device comprising:
   a housing;
   an internal unit including a light source device which emits light, and a light output device which outputs in a forward direction the light emitted from the light source device, through the housing, the internal unit being accommodated in the housing in a state in which the internal unit is tiltable with respect to the housing;
   a first operation member; and
   a second operation member,
   wherein the housing includes a rear wall part that is located rearward of the internal unit and a support point member that is provided at the rear wall part,
   wherein the internal unit includes a support point part which is tiltably supported by the housing and is coupled to the support point member,
   wherein the support point member and the support point part form a spherical bearing,
   wherein the first operation member tilts the internal unit around the support point part in a first direction perpendicular to a forward and rearward direction with respect to the housing,
   wherein the second operation member tilts the internal unit around the support point member in a second direction perpendicular to the forward and rearward direction with respect to the housing, and
   wherein in a front view, the support point part is disposed in an area center of the internal unit or at a location that is in a vicinity of the area center, and the support point part is disposed closer to the area center of the internal unit than the first operation member and the second operation member.

2. The head lamp device according to claim 1, wherein the light source device includes a light emitting diode.

3. The head lamp device according to claim 1,
   wherein in the front view, a wall surface of the rear wall is continuous, in a region including the light source device or the area center.

4. The head lamp device according to claim 1,
   wherein in the front view, the support point part is disposed at a center of the internal unit in a vertical direction or at a location that is in a vicinity of the center of the internal unit in the vertical direction, and
   wherein the support point part is tiltable around an axis line extending in a rightward and leftward direction.

5. The head lamp device according to claim 1,
   wherein in the front view, the support point part is disposed at a center of the internal unit in a lengthwise direction or at a location that is in a vicinity of the center of the internal unit in the lengthwise direction, and wherein the support point part is tiltable in a direction perpendicular to the lengthwise direction.

6. The head lamp device according to claim 1,
wherein in the front view, the support point part is disposed at a center of the internal unit in a rightward and leftward direction or at a location that is in a vicinity of the center of the internal unit in the rightward and leftward direction, and wherein the support point part is tiltable around an axis line extending in a vertical direction.

7. The head lamp device according to claim 1,
wherein in the front view, a distance from the area center of the internal unit to the support point part is shorter than a half of a distance from the area center of the internal unit to the first operation member and is shorter than a half of a distance from the area center of the internal unit to the second operation member.

8. A head lamp device of a straddle vehicle, the head lamp device having an optical axis adjustment mechanism, the head lamp device comprising:
   a housing; and
   an internal unit including a light source device which emits light, and a light output device which outputs in a forward direction the light emitted from the light source device, through the housing, the internal unit being accommodated in the housing in a state in which the internal unit is tiltable with respect to the housing,
   wherein the housing includes a rear wall part that is located rearward of the internal unit and a support point member that is provided at the rear wall part,
   wherein the internal unit includes a support point part which is tiltably supported by the housing and is coupled to the support point member,
   wherein the support point member and the support point part form a spherical bearing, and
   wherein in a front view, the support point part is disposed at a location where the support point part overlaps with the light source device or at a location that is adjacent to the location where the support point part overlaps with the light source device.

9. The head lamp device according to claim 8,
wherein the light source device includes a light emitting diode.

10. The head lamp device according to claim 9,
wherein in the front view, a distance from an area center of the internal unit to the support point part is shorter than a half of the distance from the area center of the internal unit to a first operation member and is shorter than a half of a distance from the area center of the internal unit to a second operation member.

11. The head lamp device according to claim 8,
wherein in the front view, a wall surface of the rear wall part is continuous in a region including the light source device or an area center of the internal unit.

12. The head lamp device according to claim 8,
wherein in the front view, the support point part is disposed at a center of the internal unit in a vertical direction or at a location that is in a vicinity of the center of the internal unit in the vertical direction, and wherein the support point part is tiltable around an axis line extending in a rightward and leftward direction.

13. The head lamp device according to claim 8,
wherein in the front view, the support point part is disposed at a center of the internal unit in a lengthwise direction or at a location that is in a vicinity of the center of the internal unit in the lengthwise direction, and wherein the support point part is tiltable in a direction perpendicular to the lengthwise direction.

14. The head lamp device according to claim 8,
wherein in the front view, the support point part is disposed at a center of the internal unit in a rightward and leftward direction or at a location that is in a vicinity of the center of the internal unit in the rightward and leftward direction, and wherein the support point part is tiltable around an axis line extending in a vertical direction.

15. The head lamp device according to claim 8,
a first operation member that tilts the internal unit around the support point part in a first direction perpendicular to a forward and rearward direction, with respect to the housing; and a second operation member that tilts the internal unit around the support point member in a second direction perpendicular to the forward and rearward direction, with respect to the housing, wherein in the front view, the support point part is disposed closer to an area center of the internal unit than the first operation member and the second operation member.

* * * * *